United States Patent [19]

Suzuki

[11] Patent Number: 5,389,955
[45] Date of Patent: Feb. 14, 1995

[54] IMAGE FORMING APPARATUS DIRECTLY CORRECTING AN IMAGE DATA IN RESPONSE TO CHANGES IN IMAGE POTENTIAL DATA

[75] Inventor: Nobuo Suzuki, Kanagawa, Japan

[73] Assignee: Fuji Xerox Co., Ltd., Tokyo, Japan

[21] Appl. No.: 137,923

[22] Filed: Oct. 19, 1993

[30] Foreign Application Priority Data

Feb. 24, 1993 [JP] Japan ................................ 5-035206

[51] Int. Cl.⁶ .............................................. B41J 2/435
[52] U.S. Cl. ...................................... 347/112; 355/208
[58] Field of Search ...................... 346/1.1, 76, 107 R, 346/108, 160; 355/246, 208, 245

[56] References Cited

U.S. PATENT DOCUMENTS

| | | | |
|---|---|---|---|
| 4,571,068 | 2/1986 | Tarumi et al. | 355/246 |
| 4,619,522 | 10/1986 | Imai | 355/208 |
| 5,237,369 | 8/1993 | Maruta et al. | 355/208 |

FOREIGN PATENT DOCUMENTS 63-113568 5/1988 Japan .

*Primary Examiner*—Mark J. Reinhart
*Attorney, Agent, or Firm*—Finnegan, Henderson, Farabow, Garrett & Dunner

[57] ABSTRACT

An image forming apparatus detects a potential of a latent image of a reference gradation pattern formed on a photosensitive member and controls the latent image potential so as to be fixed to maintain a good gradation characteristic. The apparatus comprises image data conversion means for converting input image data in accordance with conversion information, a RAM for storing electrostatic latent image potential data for an input coverage value in an initial condition, an optical system for exposing a reference pattern of an input coverage value on the photosensitive member to light to form an electrostatic latent image, an electrostatic potential sensor for detecting a potential of the electrostatic latent image of the reference pattern formed by the optical system, and means for comparing such detected potential data and potential data stored in the RAM and modifying, when the difference between them is greater than a predetermined value, the conversion information for the image data conversion means so that the electrostatic latent image potential at a same input image data value may be substantially equal to the electrostatic latent image potential in the predetermined condition.

6 Claims, 7 Drawing Sheets

| COLOR i | 1 | 2 | 3 | 4 |
|---|---|---|---|---|
| 1 | $V_{11}$ | $V_{21}$ | $V_{31}$ | $V_{41}$ |
| 2 | $V_{12}$ | $V_{22}$ | $V_{32}$ | $V_{42}$ |
| ⋮ | ⋮ | ⋮ | ⋮ | ⋮ |
| J | $V_{1j}$ | $V_{2j}$ | $V_{3j}$ | $V_{4j}$ |
| ⋮ | ⋮ | ⋮ | ⋮ | ⋮ |
| N | $V_{1N}$ | $V_{2N}$ | $V_{3N}$ | $V_{4N}$ |

IMAGE FORMING APPARATUS DIRECTLY CORRECTING AN IMAGE DATA IN RESPONSE TO CHANGES IN IMAGE POTENTIAL DATA

BACKGROUND OF THE INVENTION

1. Field of the Invention

This invention relates to an image forming apparatus, and more particularly to an apparatus which compensates for a variation in picture quality of an image forming apparatus, which forms an electrostatic latent image on a photosensitive member and develops the electrostatic latent image into a visible image, caused by a change in environment, aging or some other cause to allow an image of a stabilized gradation and tone to be formed.

2. Description of the Related Art

While an electrophotographic apparatus includes a large number of components, the charging characteristic of a photosensitive drum, the output intensity of a light source and the charging characteristics of a developer unit and a developer are factors which are unstable with regard to a variation in environment and passage of time, and accordingly, if the characteristics of the components vary, then the picture quality of an image of a half tone is liable to change. In a color printer, a variation in tone caused by a change in concentration of colors matters particularly with a half tone. However, a color adjusting operation is complicated very much, and automation is demanded in this regard. Simultaneously, stabilization in reproducibility in color is demanded for successive operations.

As a method for controlling the variation of the color reproducibility caused by a variation of the environment and passage of time, it is known to form a reference gradation pattern on a photosensitive drum, develop the pattern actually, detect the concentration of the thus developed image and feed back such detection signal to one or a plurality of ones of several image formation parameters.

The concentration detection method then may be 1) a method wherein the concentration is detected directly on the photosensitive drum, 2) another method wherein a reference pattern developed is transferred to the photosensitive drum and the concentration of the thus transferred image is detected or some other method. Whichever method is adopted, after detection of the concentration, the photosensitive drum or the transfer drum must be cleaned to remove the reference pattern.

Conventionally, while a reference concentration pattern is developed actually on the photosensitive drum and the gradation concentration of the developed image is detected by means of detection means as described above, difficulty is involved in processing of the developed image after detection. In particular, during successive operations, it is impossible to transfer the reference pattern for control to paper and discharge the paper, and accordingly, cleaning processing must be performed for the photosensitive drum to remove the reference pattern. However, since a pattern of a high concentration portion or a high concentration area applies a load to the cleaning unit, when the cleaning unit does not have a sufficient cleaning capacity, the pattern may possibly have a bad influence as a ghost upon a next print.

In the meantime, where a special adjusting mode is provided in which transfer to the transfer drum is performed, a reference concentration pattern transferring sheet or a cleaner for exclusive use must be prepared, and besides, an adjusting operation during successive operations is impossible.

SUMMARY OF THE INVENTION

It is an object of the present invention to provide an image forming apparatus wherein the gradation characteristic of an image of a half tone can be maintained good.

It is another object of the present invention to provide an image forming apparatus which eliminates any problem involved in cleaning of a photosensitive drum or a transfer drum.

The present invention has been made taking notice of a particularly high influence of a variation of the characteristic of a photosensitive drum and a variation of the output intensity of a light source from among components of an electrophotographic apparatus which are unstable with regard to a variation of the environment such as the temperature, the humidity or the like or passage of time, and involves detecting the potential at the stage of a latent image of a reference gradation pattern formed on the photosensitive drum and controlling the potential of the latent image so that it may be fixed for each concentration of an image. Further, while a latent image of a reference pattern is formed on the photosensitive drum, the necessity of development of the latent image is eliminated.

In order to attain the objects described above, according to the present invention, there is provided an image forming apparatus wherein an electrostatic latent image is formed on a photosensitive member and developed into a visible image, which comprises image data conversion means for converting input image data in accordance with image data conversion information, storage means for storing electrostatic latent image potential data for at least one input coverage value in a predetermined condition, optical means for exposing a reference pattern of one or more input coverage values on the photosensitive member to light to form an electrostatic latent image, potential detection means for detecting a potential of the electrostatic latent image of the reference pattern formed by the optical means, and means for comparing potential data detected by the potential detection means and the potential data stored in the storage means with each other and modifying, when a difference between the potential data thus compared is greater than a predetermined value, the image data conversion information for the image data conversion means so that the electrostatic latent image potential at a same input image data value may be substantially equal to the electrostatic latent image potential in the predetermined condition.

With the image forming apparatus, a variation in reproducibility of the gradation and color tone caused by a variation of the environment in which the image forming apparatus operates, by aging of the photosensitive member or by some other cause can be prevented without performing development actually and without applying a burden to a cleaning apparatus or some other component of the image forming apparatus, and consequently, a good and stable image can be obtained. Further, since the automatic picture quality maintaining function can be caused to operate, the image forming apparatus can cope with any variation of the condition on the real time basis.

In this instance, the predetermined condition may be an initial condition of the image forming apparatus or alternatively a condition of the image forming apparatus in the last potential detection cycle by the potential detection means.

The image forming apparatus may form different electrostatic latent images for a plurality of different colors.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

In the following description, an image forming apparatus according to the present invention is applied to a full color electrophotographic printer which forms an image of a half tone from net point images for different colors. However, as apparent from the following description, the present invention can be applied not only to an electrophotographic apparatus of the full color type but also to an electrophotographic apparatus which forms a single color image or a multiple color image of a half tone from net point images of a single color or two colors.

Figure 1:
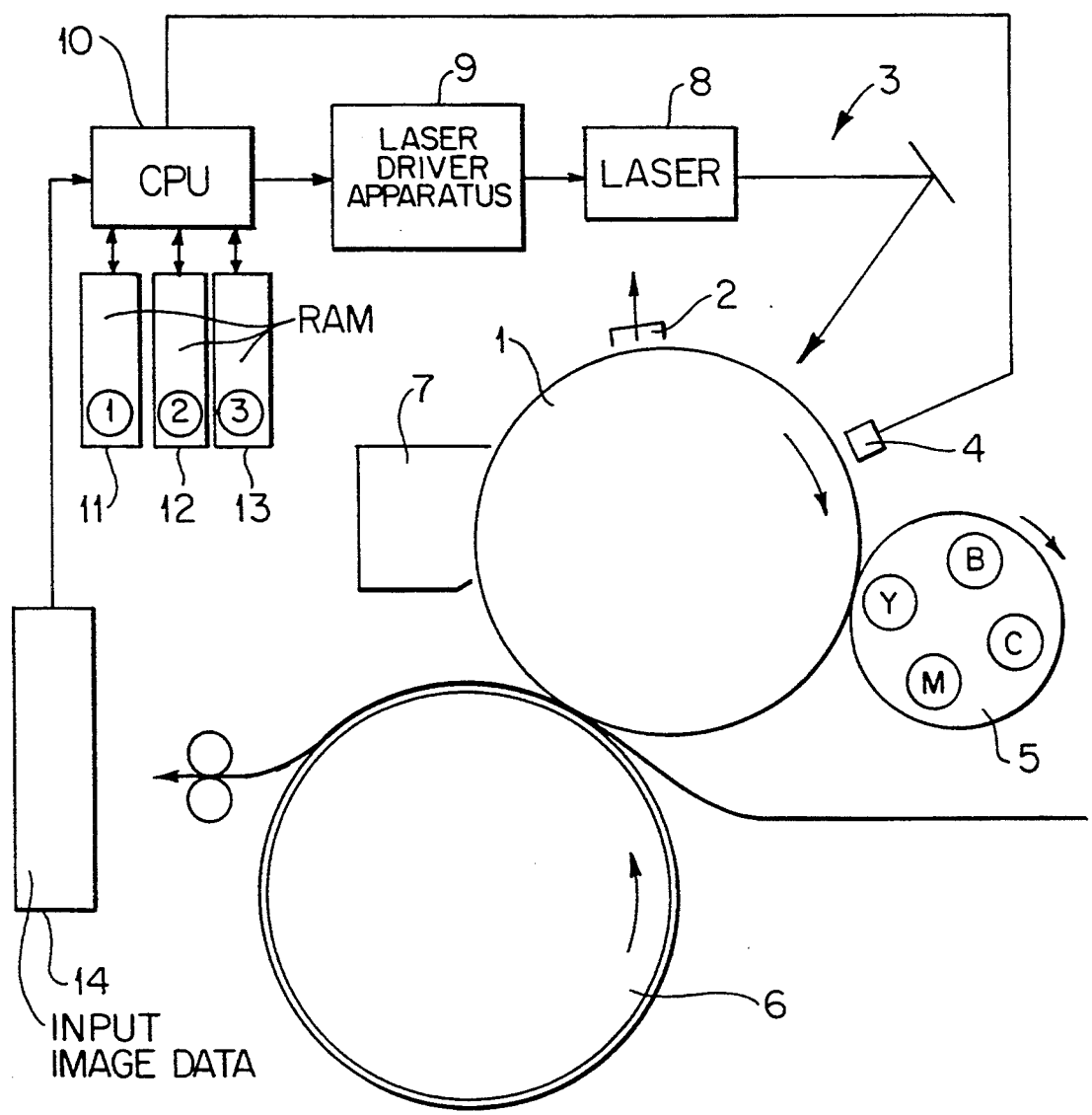
FIG. 1 is a diagrammatic view of a full color electrophotographic printer showing a preferred embodiment of the present invention.

FIG. 1 shows general construction of a full color electrophotographic printer of the type described just above. Referring to FIG. 1, the full color electrophotographic printer includes a photosensitive drum 1 which rotates in the direction indicated by an arrow mark. Disposed around the photosensitive drum 1 are a charger 2, a laser exposure optical system 3, an electrostatic potential (ESV) sensor 4, a developer unit 5, a transfer drum 6, a cleaner 7 and so forth. The laser exposure optical system 3 includes a laser 8 which is driven by a laser driver apparatus 9, which is in turn controlled by a CPU (central processing unit) 10. A RAM (random access memory) ① 11, another RAM ② 12 and a further RAM ③ 13 are connected to the CPU 10, and input image data 14 is inputted to the CPU 10.

In an ordinary printing operation, for each color, the photosensitive drum 1 is charged uniformly by the charger 2 and then a net point image of the color is formed as a latent image on the photosensitive drum 1 by the laser exposure optical system 3. and then the developer unit 5 is selected to a color corresponding to the color and develops the latent image, whereafter a toner image of the color attracted to the transfer drum 6 is transferred to paper and then the toner powder remaining on the photosensitive drum 1 is removed by the cleaner 7. Then, a similar sequence of steps is repeated similarly for each of the other colors so that images of the four colors of Y (yellow), M (magenta), C (cyan) and B (black) are formed in an overlapping relationship on the same paper. Then, the paper is removed from the transfer drum 6, and then a fixing operation is performed for the paper. Further, in the full color electrophotographic printer of the present embodiment, the potentials of the latent images of the net point images of the colors formed by the laser exposure optical system 3 are measured by the ESV sensor 4 as hereinafter described.

Figure 2:
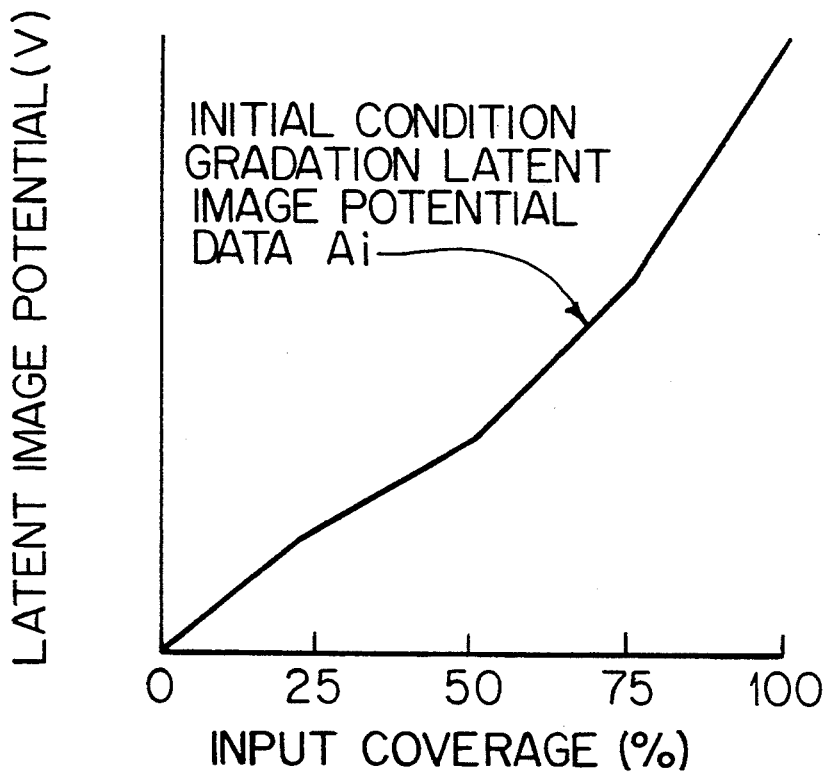
FIG. 2 is a diagram illustrating initial condition gradation latent image potential data with respect to an input coverage.

By the way, if a latent image of a half tone image of a certain coverage (ratio of black portions in a net point image) is formed for each color on the photosensitive drum 1, then the potential there is averaged macroscopically, and the potential of a latent image which increases in response to an input coverage as shown in FIG. 2 is measured by the ESV sensor 4. However, when the surrounding environment changes or time passes, the characteristic of the photosensitive member 1, the output of the laser 8 and so forth vary, resulting in variation of the potential of a latent image with respect to the same coverage value. In short, the latent image potential varies from its initial condition gradation latent image potential data $A_i$ to gradation latent image potential data $B_i$ as seen from FIG. 3. Here, the suffix i represents a particular color and assumes one of the values i=1, 2, 3 and 4 since the full color electrophotographic printer of the present embodiment involves four colors as described above. Due to the variation described above, naturally an influence is had on the concentration gradation of the output of the printer, resulting in degradation of the picture quality, a change in tone or the like.

Figure 3:
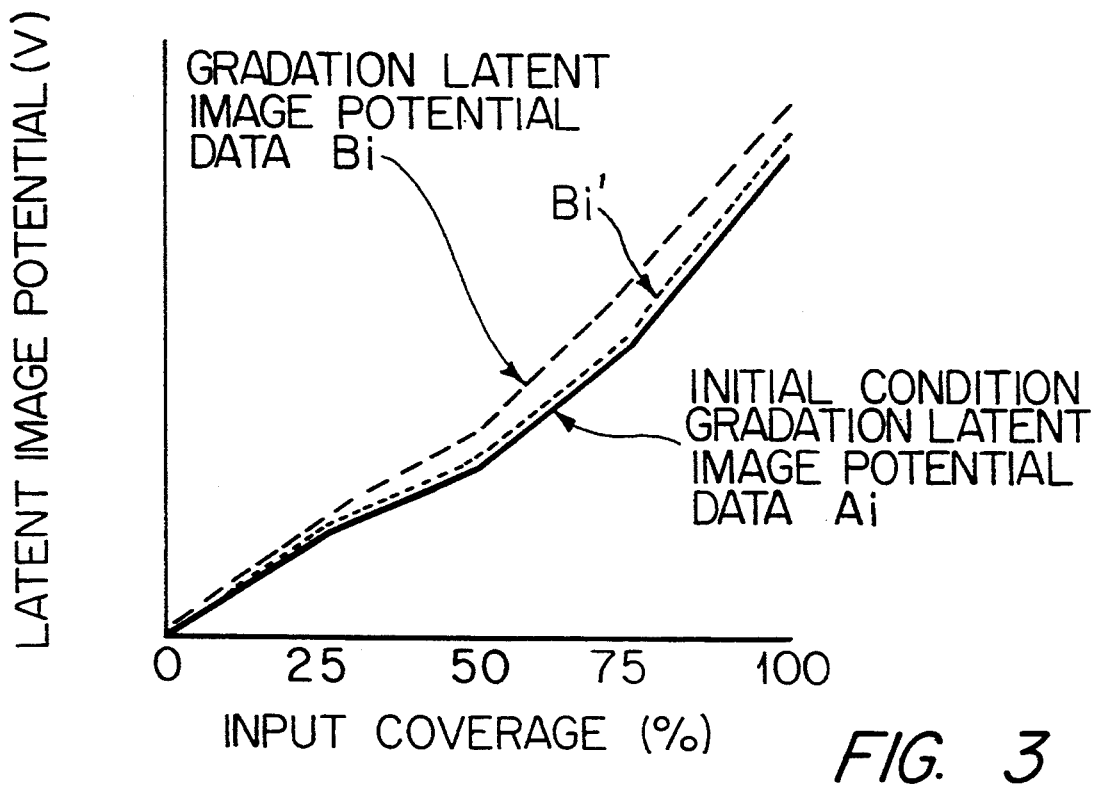
FIG. 3 is a diagram illustrating a manner in which gradation latent image potential data varies.
Figure 4:
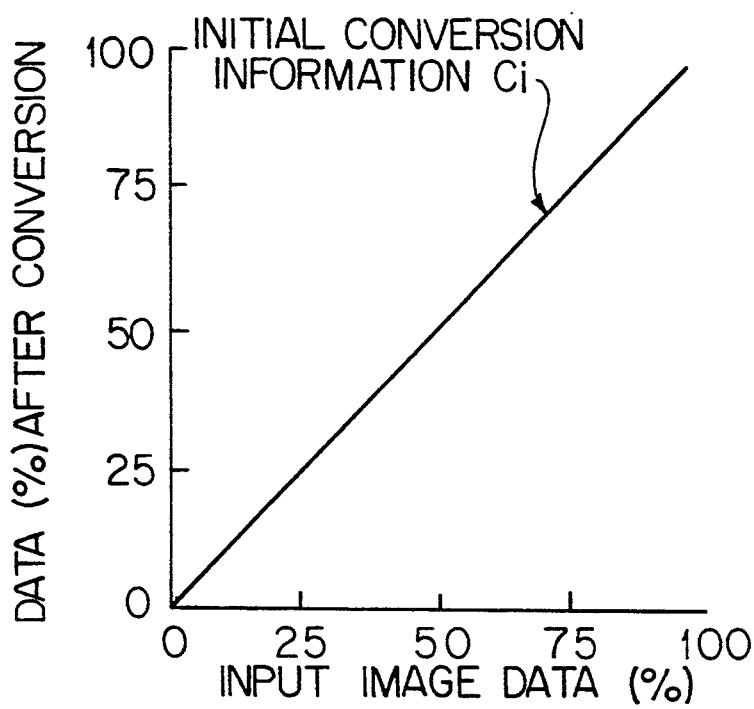
FIG. 4 is a diagram schematically illustrating a function of an image data conversion apparatus.

Therefore, in the full color electrophotographic printer of the present embodiment, an image data conversion apparatus having a function schematically shown as a graph in FIG. 4 is provided in the RAM ③ 13. The image data conversion apparatus converts the input image data 14 in accordance with the graph of FIG. 4 and inputs data obtained by the conversion to the laser driver apparatus 9. In particular, the image data conversion apparatus converts, when the gradation latent image potential varies as described above, the input image data 14 so as to compensate for the variation. FIG. 4 illustrates an initial condition of the image data conversion apparatus, and it is assumed that the image data conversion apparatus has such conversion information which requires no conversion in the initial condition. However, as apparent from the description below, the conversion information need not necessarily involve any conversion in the initial condition and may have such a curve as compensates for non-linearity of the photosensitivity characteristic, for non-linearity of the net point concentration or the visual concentration or the like. Further, the image data conversion information Ci of the image data conversion apparatus can be re-written so that the output signal with regard to the input image data 14 can be changed arbitrarily in accordance with the conversion information Ci. In short, the gradation characteristic is not limited to a linear one but can be set arbitrarily. When the gradation latent image potential rises as a whole as seen in FIG. 3, the image data conversion apparatus converts the input image data so that the input image data may be lowered as a whole.

Meanwhile, in the RAM ① 11, such initial condition gradation latent image potential data Ai (i=1, 2, 3, 4) in the initial condition in which the full color electrophotographic printer can print an image of a desired picture quality as shown in FIG. 2 are stored. The initial condition gradation latent image potential data Ai are set in an initial setting mode which will be hereinafter described.

Figure 5:
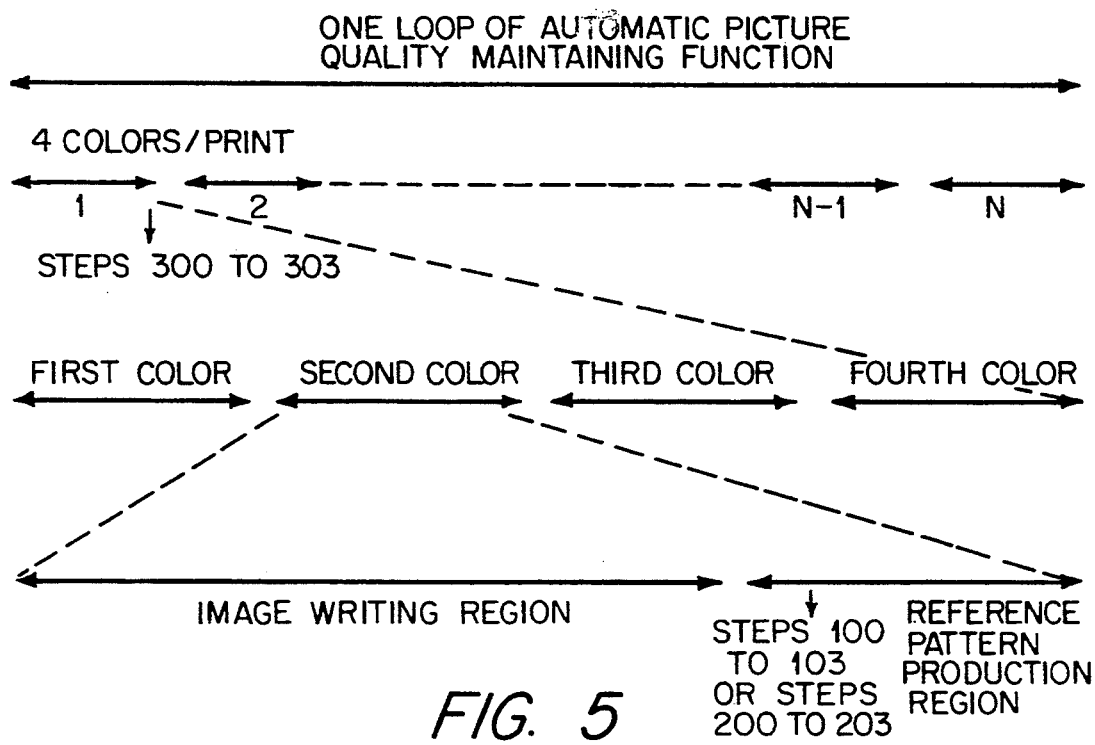
FIG. 5 is a time chart illustrating a loop for an automatic picture quality maintaining function.

FIG. 5 shows a timing chart of a loop for an automatic picture quality maintaining function of the printer. In the loop, a printing operation for forming a print of at least four colors is performed once or successively N times, and each of such printing operations includes a series of color image forming operations of four colors. Each of such color image forming operations includes an image writing region for the color and a reference pattern production region for an inter image section following the image writing region. In the reference pattern production region set in the inter-image section, the gradation latent-image potential data Ai and Bi are measured. Such automatic picture quality maintaining function loop may be performed at the beginning of each one of successive printing operations or may alternatively be performed upon turning on of the power or for each predetermined number of prints.

Figure 6:
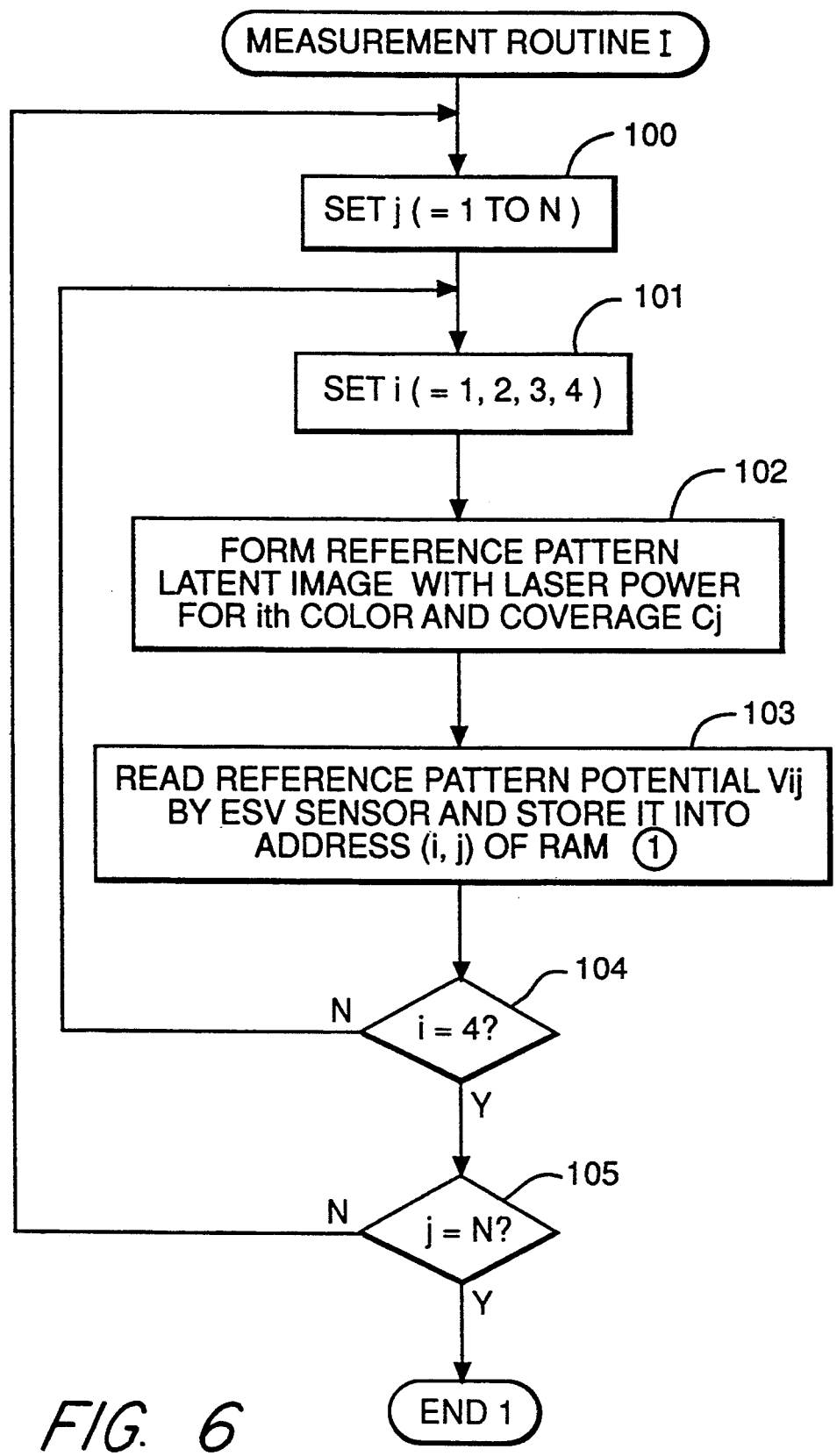
FIG. 6 is a flow chart illustrating a routine for detecting initial condition gradation latent image potential data.

The initial setting mode will be described first. In the initial setting mode, initial condition gradation latent image potential data Ai is detected in accordance with a measurement routine I illustrated in FIG. 6. Referring to FIG. 6, the value j of an input coverage Cj to be detected now is set first at step 100. The coverage Cj is set successively to one of several points between 0 to 100%, for example, 0%, 25%, 50%, 75% and 100% in advance. Then at step 101, a color i to be detected subsequently is successively set. This is because gradation latent image potential data must necessarily be detected for each of the colors since, when the set input coverage Cj is equal, even if the intensity of the laser light is equal, the latent image potential is different depending upon the color. Subsequently at step 102, a reference pattern latent image is formed in the reference pattern production region (FIG. 5) of the inter image section on the photosensitive drum 1 using a laser light signal from the laser exposure optical system 3 set with a laser power corresponding to the set ith color and modulated with a duty ratio corresponding to the coverage Cj.

Figures 9, 10:
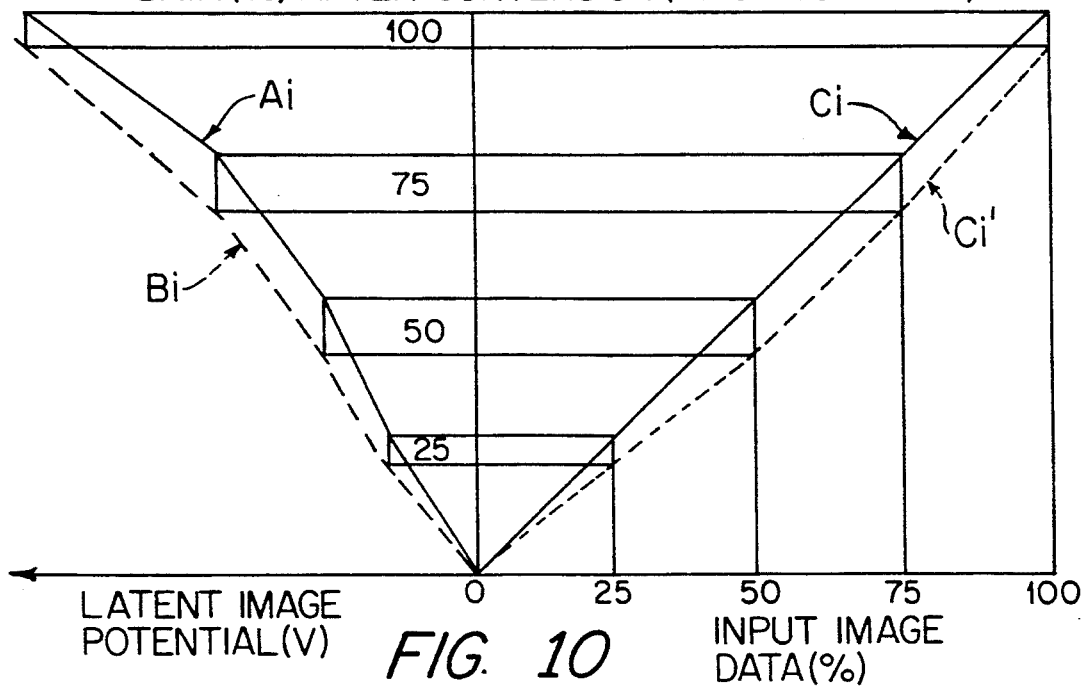
FIG. 9 is a table showing an example of storage format for gradation latent image potential data.
FIG. 10 is a diagram illustrating an example of method of modifying image data conversion information.

Then at step 103, an average surface potential Vij of the net point latent image is detected by the ESV sensor 4, and such detection signal is temporarily stored into an address of the RAM ① 11 corresponding to the set input coverage Cj and color i. An example of data format then is illustrated in FIG. 9.

Figure 8:
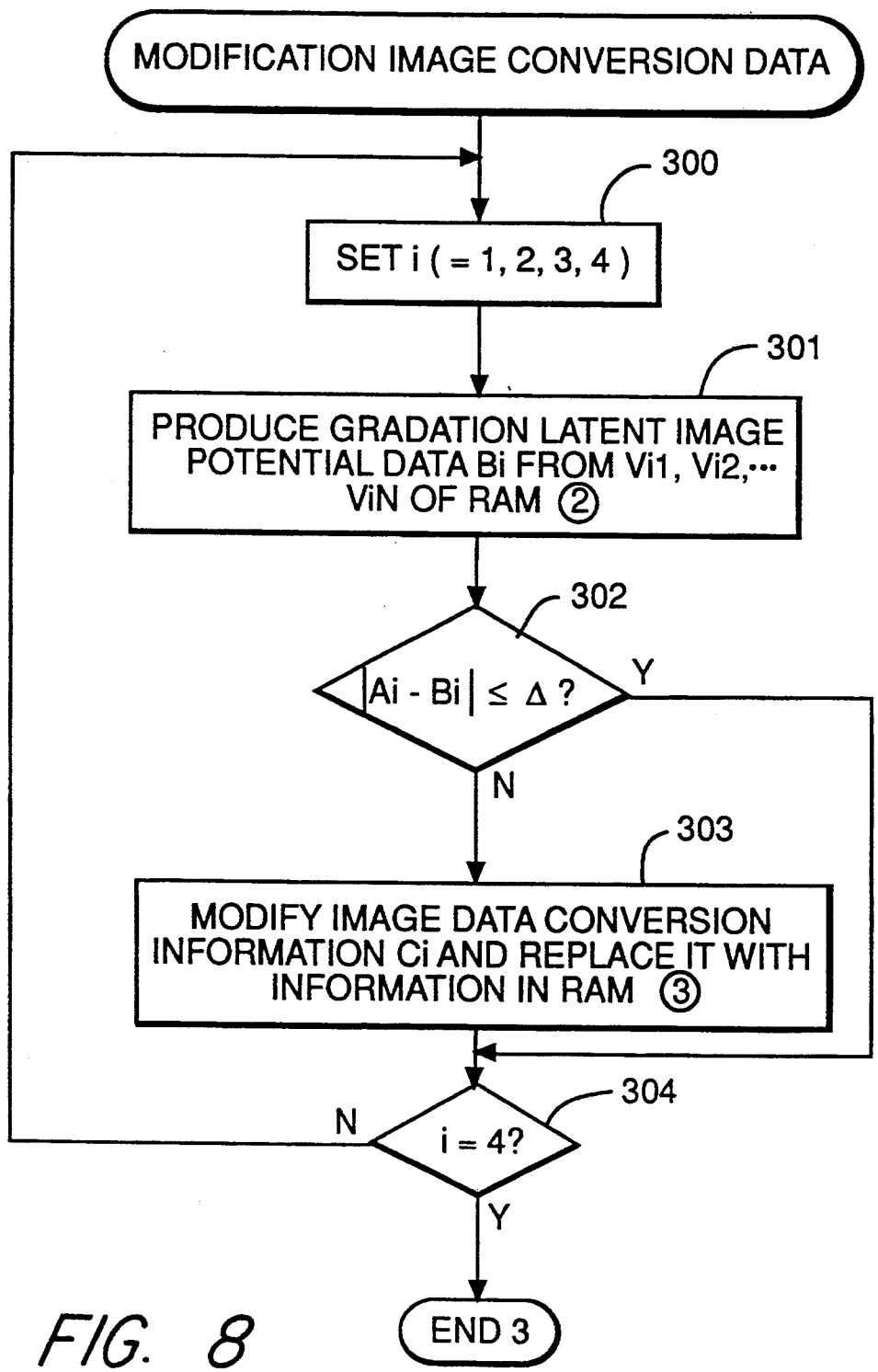
FIG. 8 is a flow chart illustrating a routine for modifying image data conversion information.

The steps 101 to 103 are repeated four times for the colors i=1 to 4 to measure the average surface potentials Vij for the input coverage Cj in this manner, and thereafter, average surface potentials Vij for the colors are measured similarly with a next input coverage Cj. In this manner, the measurement operation is repeated N times changing the input coverage Cj for j=1 to N. Accordingly, a time for N prints is required for the measurement. It is to be noted that, if reference patterns of m different coverages are produced for each color during printing of a print, then the required time is reduced to a time for N/m prints. The value of N depends upon with what degree of accuracy such data as illustrated in FIG. 8 are obtained.

From N detection signals Vi1 to ViN for each of the colors i=1 to 4 obtained in this manner, initial condition gradation latent image potential data Ai of FIG. 3 are obtained for each color (i=1, 2, 3, 4). The image forming apparatus operates in such a manner as described above in the initial setting mode.

Figure 7:
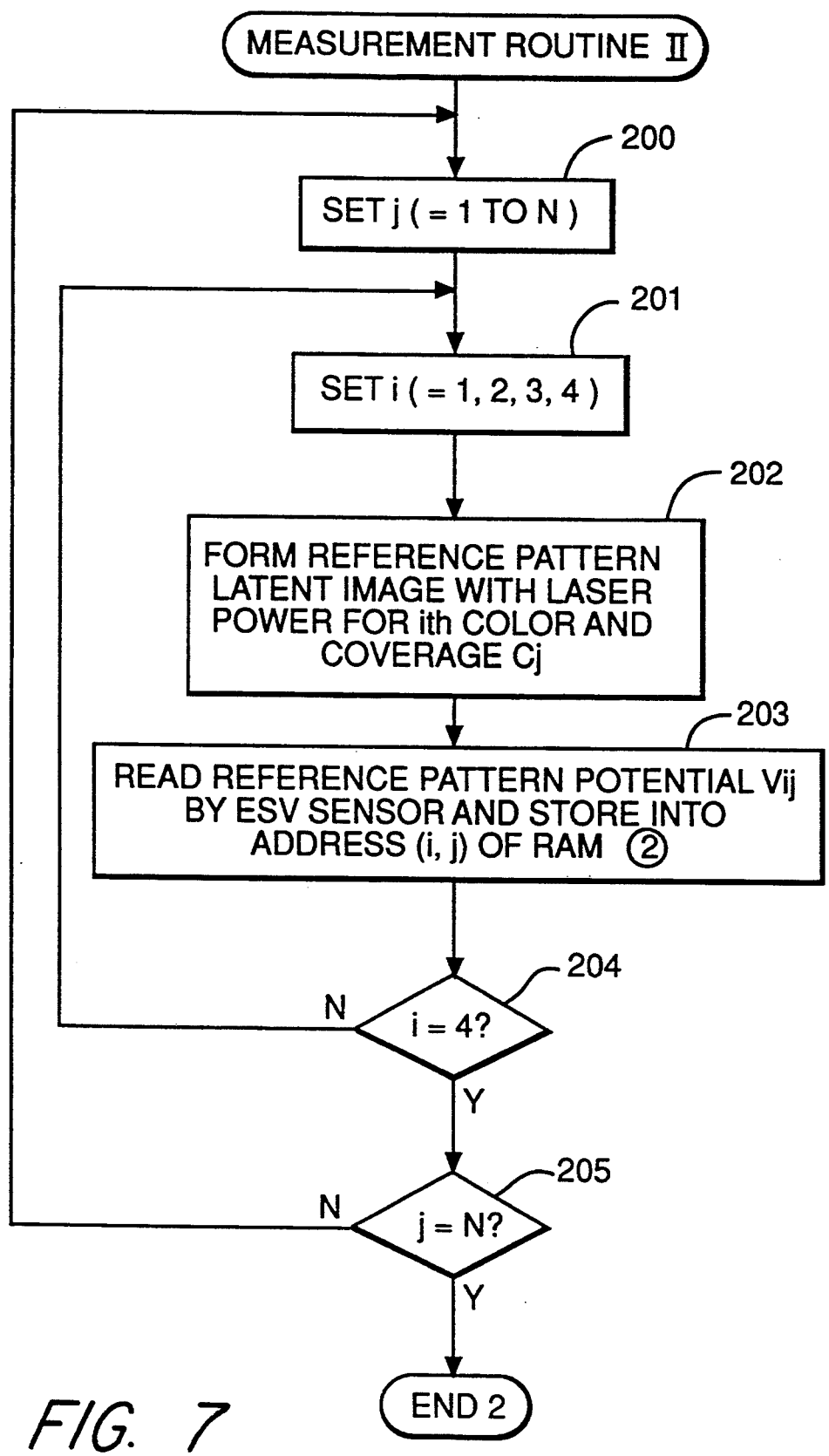
FIG. 7 is a flow chart illustrating a routine for detecting gradation latent image potential data in each measurement cycle.

Subsequently, the flows of operation when the automatic picture image maintaining function of the image forming apparatus operates will be described with reference to FIGS. 7 and 8. FIG. 7 illustrates a measurement routine II for measuring gradation latent image potential data Bi, which is executed, for example, upon starting of each of successive printing operations, upon turning on of the power or after printing of each predetermined number of prints as described hereinabove and is similar to the measurement routine I of FIG. 6. In particular, referring to FIG. 7, a value j for an input coverage Cj to be detected subsequently is set first at step 200. Then at step 201, a color i to be detected subsequently is set in order. Then at step 202, using a laser light signal from the laser exposure optical system 3 set with a laser power corresponding to the set ith color and modulated with a duty ratio corresponding to the set coverage Cj, a reference pattern latent image is produced in the reference pattern production region of the inter image section on the photosensitive drum 1. Subsequently at step 103, an average surface potential Vij of the net point latent image is detected by means of the ESV sensor 4, and such detection signal is temporarily stored into an address of the RAM ② 12 corresponding to the set input coverage Cj and color i.

Such sequence of operations is repeated a predetermined number of times for each input coverage Cj (j=1 to N) to measure N detection signals Vi1 to ViN for each color i=1 to 4 so that gradation latent image potential data Bi of FIG. 3 are obtained for the colors (i=1, 2, 3, 4). It is to be noted that, while the time for N prints is required for the measurement also in this instance, if reference patterns for m different coverages are produced for each color during printing for one print, then the required time is reduced to the time for N/m prints.

Subsequently, such modification to image conversion data in the RAM ③ 13 as seen in FIG. 4 is performed based on the gradation latent image potential data Bi detected at predetermined timings and stored in the RAM ② 12 in this manner and the initial condition gradation latent image potential data Ai stored in the RAM ① 11. The flow of operations then is illustrated in FIG. 8. Referring to FIG. 8, one of the colors i=1 to 4 is set first at step 300, and then at step 301, such gradation latent image potential data Bi as seen in FIG. 7 is produced from the detection signals Vi1 to ViN in the RAM ② 12. Then at step 302, the gradation latent image potential data Bi and the initial condition gradation latent image potential data Ai of the color in the RAM ① 11 are compared with each other to determine whether or not the different between them is within a predetermined allowable value Δ to determine whether or not the image conversion data should be modified. The allowable value Δ is determined taking a measurement error in latent image potential or the like into consideration. However, while, for example, Bi' in FIG. 3 is Ai≠Bi', since the difference between them is very small, it is determined that Ai=Bi'.

If the result of determination at step 302 is that the image conversion data should be modified, modification to the image data conversion information Ci is performed at step 303. An example of method of the modification will be described with reference to FIG. 10. In FIG. 10, such image data conversion information as illustrated in FIG. 4 is shown in the first quadrant, and the axis of abscissa represents image input data and the axis of ordinate represents data after conversion. In the second quadrant, such gradation latent image potential data as seen in FIG. 3 are shown, and the axis of ordinate represents an input coverage and the axis of abscissa represents a latent image potential. Since data after conversion corresponds to an input coverage, they are indicated in the same unit and in the same position. The image conversion data is stored as initial information Ci in the RAM ③ 13. Now, it is assumed that the image conversion data varies from the initial value Ai to Bi. In this instance, for each coverage value, a current latent image potential is read from the curve of Ai, and then a coverage value from which the latent image potential is to be obtained is read from the curve Bi. Then, a straight line is drawn in parallel to the axis of ordinate from the position of the initial image conversion data curve Ci corresponding to a first coverage value, and then an intersecting point between the straight line and a modified coverage value read from the curve Bi is determined as modified image conversion data Ci'. Similar modification is performed successively for different coverage values, and then modified data obtained by such modification are interconnected by way of a broken line as seen in FIG. 10 to obtain modified image conversion data Ci' for the color. It can be seen from FIG. 10 that, if the input image data 14 is converted into an input coverage value based on the new image conversion data Ci' and a latent image of the input image is formed on the photosensitive drum 1 in accordance with the input coverage value, then while the gradation latent image potential data is Bi, a latent image potential distribution similar to that with the initial gradation latent image potential data Ai can be obtained. In this manner, at step 303, the image data conversion information Ci of the color i is modified into new information Ci' and the original information in the RAM ③ is replaced with the new information Ci'.

The sequence of operations is repeated a predetermined number of times for each of the colors i=1 to 4 to effect modification to the image conversion data of all of the colors.

Then, upon next modification to the image conversion data, the initial condition gradation latent image potential data Ai are not stored in the RAM ① any more, and instead, the new measurement gradation latent image potential data are stored. Consequently, the reference value in comparison at step 302 is not the initial condition gradation latent image potential data Ai but the gradation latent image potential data Bi stored in the RAM ② 12. Further, the image conversion data to be modified is the image data conversion information Ci' modified in the preceding cycle and stored in the RAM ③ 13.

If such a sequence of operations as described above is performed in an ordinary printing operation, then the automatic picture quality maintaining function operates effectively.

It is to be noted that, while the full color electrophotographic apparatus in the embodiment described above is constructed such that the initial values of the image conversion data and the gradation latent image potential data are not left in the memory but are successively re-written for each measurement, it may be modified such that the initial data are left so that image data conversion information may be modified with reference to the initial data before it is used.

Having now fully described the invention, it will be apparent to one of ordinary skill in the art that many changes and modifications can be made thereto without departing from the spirit and scope of the invention as set forth herein.

What is claimed is:

1. An image forming apparatus wherein an electrostatic latent image is formed on a photosensitive member and developed into a visible image, comprising:

image data conversion means for converting input image data in accordance with image data conversion information;

storage means for storing electrostatic latent image potential data for at least one input coverage value in a predetermined condition;

optical means for exposing a reference pattern of one or more input coverage values on said photosensitive member to light to form an electrostatic latent image;

potential detection means for detecting a potential of the electrostatic latent image of the reference pattern formed by said optical means; and means for comparing potential data detected by said potential detection means and the potential data stored in said storage means with each other and modifying, when a difference between the potential data thus compared is greater than a predetermined value, the image data conversion information for said image data conversion means so that the electrostatic latent image potential at a same input image data value may be substantially equal to the electrostatic latent image potential in the predetermined condition.

2. An image forming apparatus according to claim 1, wherein the predetermined condition is an initial condition of said image forming apparatus.

3. An image forming apparatus according to claim 1, wherein the predetermined condition is a condition of said image forming apparatus in the last potential detection cycle by said potential detection means.

4. An image forming apparatus according to any one of the preceding claims, wherein said image forming apparatus forms different electrostatic latent images for a plurality of different colors.

5. An image forming apparatus having an image forming and developing portion in which an input latent image is formed on a photosensitive member and then developed into a visible image, the apparatus comprising:

input image data sending portion for inputting image data;

means for forming a plurality of reference pattern latent images on the photosensitive member, each of a predetermined coverage value;

means for detecting a potential of at least one of the plurality of reference pattern latent images; and means for processing the image data from the input image data sending portion, and including;

means for providing a plurality of reference potential values each corresponding to one of the plurality of reference pattern latent images of predetermined coverage values;

means for determining a change in an input coverage potential value by comparing the reference potential value and the potential value measured by the potential detecting means for at least one of the plurality of reference pattern latent images; and means for compensating the change in an input coverage potential value when the input image data from the sending portion is converted into data for sending to the image forming and developing portion.

6. An image forming apparatus according to claim 5, wherein said compensating means includes a converting table having values which compensate for the change in an input coverage potential value.

* * * * *